Feb. 12, 1946.　　　　A. E. BAAK　　　　2,394,885

LIQUID LEVEL RESPONSIVE MEANS

Filed June 17, 1942

INVENTOR.
Albert E. Baak
BY George H. Fisher
Attorney

Patented Feb. 12, 1946

2,394,885

UNITED STATES PATENT OFFICE 2,394,885

LIQUID LEVEL RESPONSIVE MEANS

Albert E. Baak, Minneapolis, Minn., assignor to Minneapolis-Honeywell Regulator Company, Minneapolis, Minn., a corporation of Delaware Application June 17, 1942, Serial No. 447,352

28 Claims. (Cl. 122—448)

The present invention relates generally to liquid level responsive means and more particularly to such means comprising a member adapted for mounting in a boiler having a pair of elements which change an electrical conductive capacity in response to liquid level changes, and a translating means controlled by such means which respond to the difference in electrical capacity of said elements.

An object of this invention is to provide a liquid level responsive element adapted for mounting in a boiler of relatively compact dimensions and having a first element which extends into the liquid or into the vapor of said liquid and a second element mounted in proximity to said first element for compensating said first element for temperature fluctuations.

A further object is to provide an element as set forth in the preceding object, which comprises a tube having therein a portion of resistance wire which changes an electrical conductive capacity in response to changes in temperature.

Another object is to provide an electric translating means which operates in conjunction with an element responsive to liquid level for varying the electrical capacity in a plurality of electrical circuits for controlling means in response to differences in the capacity in said circuit.

A further object is to provide electrical translating means having a plurality of electrical resistance wires which may expand differentially in response to a plurality of conditions to actuate control means.

A further object is to provide safety means in conjunction with the translating means for positively actuating the control means in the event of failure of a part of the translating means.

A further object is to provide translating means for cooperation with an element adapted to be mounted in a boiler and operative to vary the electrical capacity of a plurality of electrical circuits having a plurality of thermally distortable members in the different circuits for actuating control means in response to differential distortions by said element.

A further object of my invention is to provide a novel electrical translating means responsive to a plurality of conditions to differentially actuate a control means.

Other objects reside in the novel structural details and arrangement of component parts and will be in part apparent or pointed out in the accompanying specification and claims.

Figure 1:
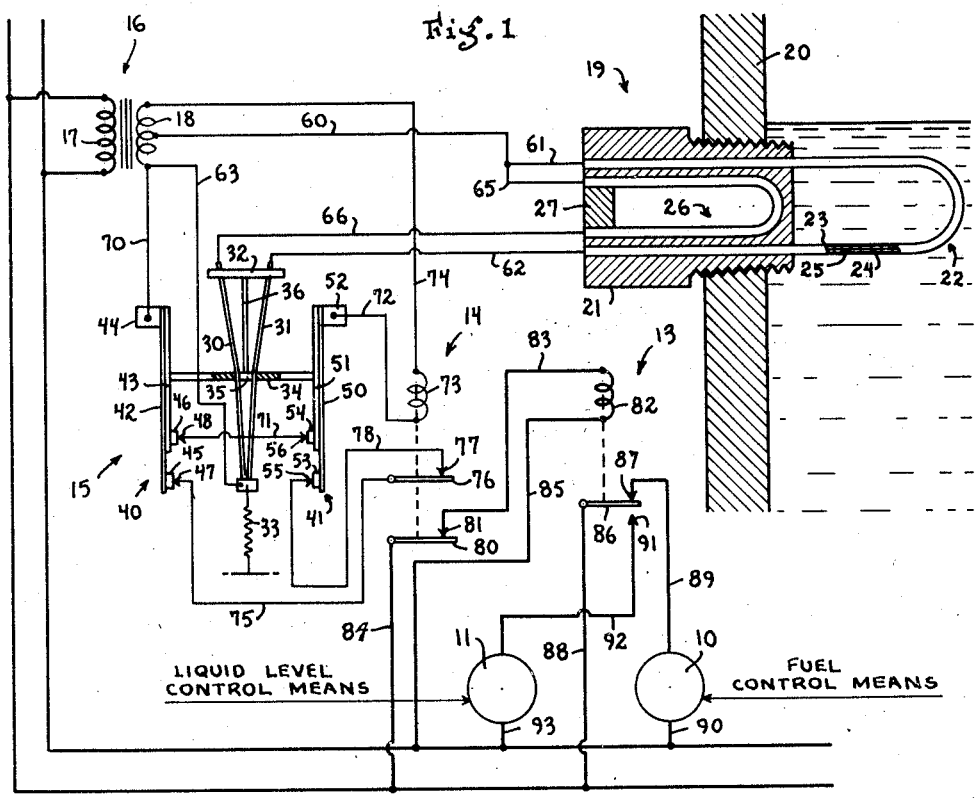
Figure 1 is a diagrammatic view of a preferred embodiment of my invention.

Referring now to Figure 1, a fuel control means 10 and a liquid level control means 11 are controlled by a relay generally indicated by the reference character 13. The relay 13 is in turn controlled by a pilot relay 14 which is operated by an electrical translating means generally indicated by the reference character 15. The translating means 15 is supplied with current from a transformer 16, made up of a primary 17 and a tapped secondary 18. The current flow to the translating means 15 passes through a liquid level responsive means generally indicated at 19 which is mounted in a boiler, a portion of which is shown at 20, adjacent the normal liquid level in said boiler. Obviously, other control means in the circuit to the fuel control means of the liquid level control means could be used, such as, for example, limit controls responsive to a boiler temperature, or some other condition controlling means such as a space thermostat, etc.

The liquid level responsive device 19 comprises a plug 21 which is screw-threaded and adapted to be mounted in the boiler. An electric resistance element 22 comprises a tube of metal 23 having a series of insulating beads 24 therein which insulatingly carry a resistance wire 25. The resistance wire 25 is so selected that it will change an electric conductive capacity in response to temperature variations. A second temperature responsive element 26, similar in all respects to the element 22, is mounted within the plug 21 and sealed therein by suitable sealing means 27. The elements 22 and 26 are so arranged that each will respond to the temperature of the liquid within the boiler 20 to a substantially corresponding degree.

The translating means 15 comprises a pair of expansible electrical conductor wires or the like, 30 and 31, which are secured at their upper end to a base portion 32 and tensioned together at their lower end by a spring 33. The wires 30 and 31 are strained towards each other by an insulating member 34 having a hole 35 in the center thereof. The insulating member 34 is held in position by a biasing lead spring 36 which is secured to the base 32. The wires 30 and 31 are adapted to expand differentially, in a manner hereinafter to be more fully described, to move the insulating switch actuating member 34 either to the right or to the left to actuate switches 40 or 41.

The switch 40 comprises flexible blades 42 and 43 mounted upon a base bracket 44 and carrying at their lower end movable contacts 45 and 46 respectively, which cooperate with stationary contact 47 and 48 respectively. When the arms 42 and 43 are moved toward the right by their own tension as the actuating member 34 is moved toward the right, the contacts 45 and 47 are adapted to engage first and the contacts 46 and 48 are adapted to engage shortly thereafter. The switch 41 is similar to the switch 40 and comprises movable blades 50 and 51 biased toward the left and mounted at their upper end to a mounting bracket 52. The switch blades 50 and 51 carry movable contacts 53 and 54 which cooperate with stationary contacts 55 and 56 respectively.

The springs mentioned above used in the translating means 15 are so selected that the spring 33 tensioning the wires 30 and 31 is the strongest and is capable of overcoming any of the other spring tensions used in the mechanism. The spring leaf 36 mounting the switch actuating member 34 is the second strongest and is adapted to actuate either the switch mechanism 40 or the mechanism 41 in the event that the wires 30 and 31 burn out. The spring tension in the switches 40 and 41 is the weakest of the three, but sufficient to give a desirable contact pressure at the various contacts when the structure is in the position shown in the drawing.

The switch structures 40 and 41 have been shown as each comprising a pair of cooperating contacts because there are certain slight variations or fluctuations in movement in the mechanism as a whole due to minor variations in temperature in the liquid level responsive device 19 which cause different quantities of current to be passed to the translating mechanism 15. However, usually these fluctuations are small and are quickly corrected as the pair of elements 22 and 26 in the liquid level responsive means 19 come up to the same temperature. With these small fluctuations the last to make contacts 46, 48 and 54, 56 may be broken. However, the switches 45, 47 and 53, 55 will not be broken unless there is a substantial fluctuation of the translating mechanism 15.

*Operation of Figure 1*

Under normal operating circumstances, the liquid level as shown in the drawing remains above the desired level. Current will then be supplied to the element 22 through the following circuit: from secondary 18 of the transformer 16 through the wire 60, wire 61, element 22, wire 62, expansible wire 31, and wire 63 back to the other side of the transformer secondary 18. This current will heat up the resistance wire 25 in the boiler element 22 and cause it to vary its electrical conductive capacity. Hence, the amount of current passing through the above traced circuit will be determined by the temperature of the element 22 which current will affect and heat up the expansible wire 31 in the translating mechanism 15.

The temperature of the element 22 will be responsive to two conditions. The first of these conditions is the temperature of the water within the container 20 which will have its effect upon varying the resistance of the resistance wire within the element 22. The second of these factors will be the rate of heat dissipation from the resistance wire 25 to the medium within the boiler. Hence, when the liquid covers the element 22 the rate of heat dissipation will be such that the wire within the element 22 will be cooled. However, when the liquid level falls below the level of the element 22 the element will not give its heat up to the vapor of the liquid at as rapid a rate as it does to the liquid itself and hence, the heat of the resistance wire 25 within the element 22 will rise. As the heat of the resistance element 22 rises, the amount of current which it will pass will be reduced and hence, the expansible wire 31 will be contracted to cause an actuation of the switch mechanism 41 under the influence of the spring 33.

A circuit to the compensating resistance element 26 in the boiler plug 19 may be traced as follows: from the transformer secondary 18 through the wire 60, a wire 65, the element 26, wire 66, expansible wire 30 in the translating element 15 and the wire 63 back to the other side of the transformer secondary 18. The resistance wire 30 in the translating means 15 is identical to the wire 31 and expands to the same degree under the influence of the same current. The boiler temperature responsive element 26 is identical to the temperature responsive element 22 in the boiler 20 and likewise responds in a similar manner to the same degree of temperature fluctuation. However, the element 26 is mounted within the plug 21 and hence, is not in direct contact with the liquid in the boiler or with the gas of that liquid when the liquid is below the level of the plug 21. Hence, it is seen that the element 26 responds substantially only to liquid temperature and is relatively insensitive to liquid level variation. On the other hand, it is seen that the element 22 is responsive to both of these conditions.

The elements 22 and 26 are of the same size and same characteristics. Likewise, the elements 30 and 31 are of the same size and have like characteristics. Therefore, when the water level is at the desired point as shown in Figure 1, the temperature of elements 22 and 26 will be the same since the temperature of element 26 corresponds to the temperature of the water through the conductive effect of the boiler wall 20 and the plug 21. It therefore follows that equal currents will flow to elements 30 and 31 and they will be heated equally. Therefore, upon any change in ambient temperature affecting elements 30 and 31 their heat loss will be the same and no movement of the contact mechanism 34 will result. Now when the water level in the boiler falls below the element 22, such element will become heated more highly, as explained above, since the vapor will not conduct away heat as rapidly as did the liquid. However, the boiler wall, and to a certain extent the plug 21, is still in contact with the liquid so that its temperature remains substantially constant even though the level of water has fallen somewhat. Therefore, there is a differential in temperature between elements 22 and 26 with the temperature of the element 22 being the higher. This results in actuation of the switch arms 50 and 51 in the manner explained above.

In Figure 1, the system is shown under normal circumstances with the liquid level in the boiler 20 above the desired level. At this time the relay 14 is energized through the following circuit: from the transformer secondary 18 through a wire 70 to the bracket 44 for the switch mechanism 40, through the contact blade 43, contact 46, contact 48, wire 71, contacts 56 and 54, switch blade 51, bracket 52, wire 72, relay winding 73, and wire 74 back to the other side of the transformer. The above traced circuit, it is noted, is through the contacts 46, 48 and 54, 56 which are made last as the movable contacts move toward the stationary contacts. As is pointed out above, the continued closure of these contacts is relatively unstable and they may be slighly open due to minor fluctuations of temperature of the elements 22 and 26 in the boiler 20. For this reason, I provide a holding circuit for the relay 14 which may be traced through the contacts 45, 47 and 53, 55 that are on or cooperable with the flexible, or pressed back, blades 42 and 50 respectively as follows: from the transformer secondary 18 through the wire 70, bracket 44, switch blade 42, contacts 45 and 47, conductor 75, relay switch blade 76, contact 77, conductor 78, contacts 55 and 53, switch blade 50, bracket 52, wire 72, relay coil 73, and wire 74 back to the other side of the transformer secondary. The above traced circuit includes the contacts carried by the pressed back contact blades in the translating mechanism 15 and hence, is not affected by minor fluctuations of the device due to slight variations in temperature which are normally quickly corrected at the boiler responsive element 19.

The relay mechanism 14 is in the nature of a pilot relay and may be mounted in mechanism adjacent the boiler, together with the translating means 15, the liquid level responsive means 19, and the transformer 16. For this reason, a second relay 13 is shown for controlling the liquid level control means and the fuel control means. This relay 13 may be mounted adjacent the fuel control means or at some other suitable place. However, this relay might be mounted also with the other structure or might be dispensed with entirely in certain applications.

The relay 13 is under control of a switch blade 80 which cooperates with a stationary contact 81 and is moved in response to energization and deenergization of the relay 14. The movable switch blade 80 controls a circuit to the relay coil 82 of the relay 13 through wires 83, 84 and 85 which completes a circuit to the line wires. When the relay coil 82 is energized, as shown, a movable switch blade 86 is in engagement with a stationary contact 87 to energize the fuel control means 10 through the wires 88, 89 and 90. When the relay coil 82 is deenergized the switch blade 86 moves into engagement with a stationary contact 91 to close a circuit to the liquid level control means 11 through the wires 88, 92 and 93. It will be understood that other control means, such as limit control, could be placed in any of the above traced circuits for the liquid level control means. It is also to be understood that either one of the control means could be dispensed with in certain applications where the other one was not desired.

When the liquid level in the boiler 20 falls below the liquid level responsive means 19, the temperature of the element 22 which responds to liquid level because it dissipates heat to the liquid at a more rapid rate than to the gas of the liquid, will rise and hence, the amount of current flowing through the element 22 will be reduced. This reduction in current flow will result in contraction of the expansible wire 31 in the translating means 15. As the expansible wire 31 contracts, the switch actuating member 34 will be moved towards the right. Movement toward the right will cause the switch blades 50 and 51 to be moved to the right which will open the contact mechanism 41. When the contact mechanism 41 is opened the relay coil 73 will be deenergized to cause the movable switch blades 76 and 80 to leave their corresponding contacts 77 and 81 respectively. When the contacts 80 and 81 separate, the relay 13 will drop out to shut off the fuel control means 10. When the relay 13 is deenergized the circuit to the liquid level control means 11 will be closed and the liquid level control means may then supply liquid to the boiler to raise the liquid level.

As the liquid level is restored to normal, that is when it reaches substantially the point shown in the drawing, the rate of heat dissipation of the element 22 will be increased to correspondingly cool the resistance wire 25 therein. This will result in the passage of greater current and the heat expansible resistance wire 31 will be expanded to cause movement of the switch actuating member 34 to the left. This movement to the left will first cause engagement of the contacts 53 and 55. However, at this time, the relay coil 73 will not be energized because the relay contacts 76 and 77 will not be in engagement. However, upon further movement of the contact mechanism 34 to the left, the contacts 54 and 56 will engage and the circuit to the relay coil 73 will be completed through the contacts 46, 48 and 54, 56 respectively in the circuit hereinbefore traced. Energization of the relay 14 will cause closure of the contacts 80 and 81 which will cause the relay 13 to be energized. Energization of the relay 13 will cause the circuit to the liquid level control means to be broken and the contact 87 to be engaged by the movable contact 86 to close the circuit herebefore traced to the fuel control means 10.

In the event that one of the heat expansible wires 30 and 31 should become broken due to receiving a blow, or should burn out due to excessive electrical current, the spring 33 would straighten out the other of these heat expansible wires to cause the switch actuating member 34 to move in one direction or the other. It is noted from the structure of the device that as this member moves in either direction it opens either of the contact structures 40 or 41. Hence, it is seen that my mechanism affords protection for the burning out of one of these wires. Likewise, if either one or the other of the resistance elements 22 or 26 located within the liquid level responsive member 19 should burn out, the cooperating heat expansible member 31 or 30 in series therewith would receive no current whatever and the entire current would flow through the other of the members. In this event, the wire which is carrying no current will contract toward the side of member 34 which it is adjacent, and the other of the wires which is now carrying all of the current load expands toward the side of member 34 as the wire which is carrying no current to cause the actuating member 34 to be moved in one direction or the other to open the switch mechanism 40 or 41.

In the event that both of the heat expansible members 30 and 31 should burn out due to the fact that after one has burned out the other will receive the entire current from the transformer secondary 18 to overload the other thereof, then the spring member 36 which mounts the switch actuating member 34, would cause movement of the member 34 in one direction or the other to open either of the switch mechanism 40 or 41 and this operation is permitted because when wires 30 and 31 burn out, the spring member 33 which was connected to wires 30 and 31, no longer has any control of member 34, and this allows spring 36 to actuate actuating member 34. The direction of bias of the member 36 will make no difference so long as it will open one or the other of the switch mechanisms to deenergize the relay 14.

From the foregoing it is seen that I have disclosed in Figure 1 a liquid level responsive control means which is a very compact structure and which may be mounted upon a boiler while requiring only a small tapped hole therein adjacent the normal liquid level therein. It is seen further that this mechanism is made up of very simple parts which are easy to fabricate and which are relatively fool-proof in operation.

Figure 2

Figure 2:
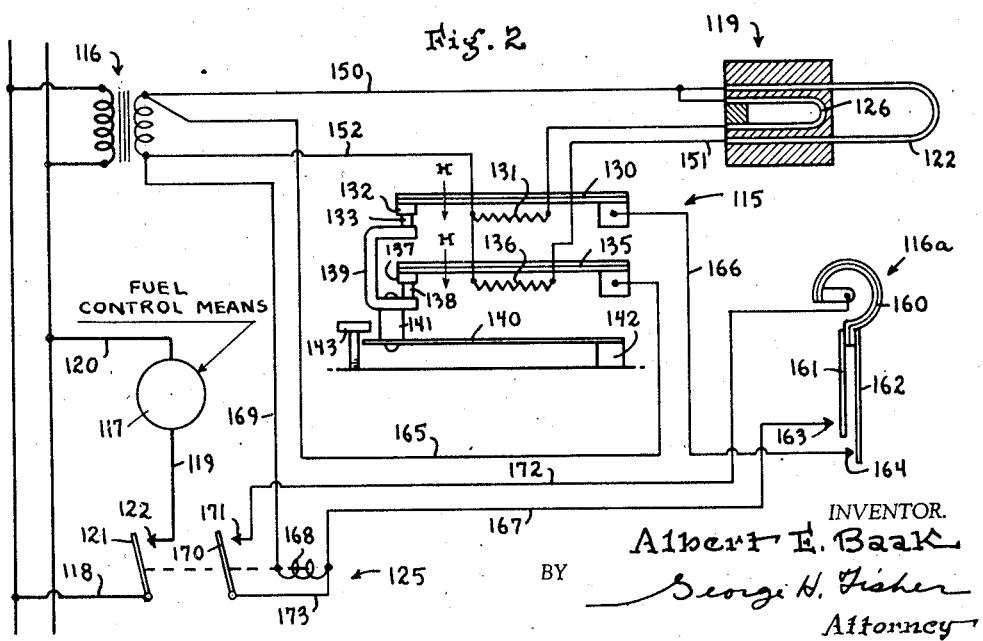
Figure 2 is a diagrammatic view of a modification thereof.

Referring now to Figure 2 wherein a modification of my invention is disclosed. A plug 119 is adapted for mounting in a boiler, and comprises a first element 122 adapted for mounting within the boiler to respond to liquid temperature as well as to liquid level and a second compensating member 126 mounted within the plug 119 for responding substantially only to liquid temperature. The boiler element 119 is supplied with current from a transformer 116 and is adapted upon variations in liquid level to actuate a translating means generally indicated by the reference character 115. A thermostat 116a is also shown as being in control of the translating means 115. The cooperation of the aforementioned means is adapted to actuate a fuel control means indicated at 117. The fuel control means is energized through wires 118, 119 and 120 by relay contacts 121 and 122 when a relay 125 is energized.

The translating mechanism 115 comprises a first bimetallic member 130 having a heater 131 therefor and a movable contact 132 cooperable with a mating contact 133. A second bimetallic member 135 has a heater 136 and carries a contact 137 which cooperates with a contact 138. The contacts 133 and 138 are carried upon poles of a magnet 139. This magnet 139 is secured to a flexible spring member 140 by means of a spacer 141. The spring 140 is mounted at one end to a base bracket 142 and is at its other end confined in movement in one direction by a stop 143. The magnet 139 is adapted at each pole to attract the free ends of the bimetallic members 130 and 135 towards the poles so as to keep the contacts 132, 133 and 137, 138 normally in engagement. As the bimetallic members 130 and 135 move in response to ambient temperature, there will be no change in the relative positions of the various contacts because, as will be noted in the drawing, the bimetallic members move in the same direction and substantially to the same degree upon a given change in temperature. However, upon a difference in heat input to the thermostatic elements 130 and 135 by the heaters 131 and 136, respectively, which change in heat capacity due to liquid level fluctuations at the liquid responsive element 119 in the same manner as the device 15 of Figure 1, there will be relative movement between the thermostatic element 130 and 135. For example, as the liquid level drops below the boiler element 122, the heat in the circuit to the heater will be decreased. This circuit may be traced as follows: from the secondary of the transformer 116 through the wire 150, element 122, wire 151, heater 136, and wire 152 back to the transformer secondary. A reduction in current flow in this circuit will result in a reduction in heat supplied to the bimetallic member 135 and it will be movel upward. This upward movement will separate the contacts 137 and 138.

The thermostat 116a controls a circuit in response to a suitable temperature condition such as boiler temperature or space temperature. Thermostat 116a comprises a bimetallic strip 160 and a relatively flexible blade 162 and a relatively stiff blade 161. The blade 162 is adapted to make contact first upon a temperature decrease and cooperates with a stationary contact 164. The switch blade 161 cooperates with a stationary contact 163 which is made at a time after the contact 164 is engaged. Engagement of the contact 163 will complete a circuit to the relay 125 as follows: from the secondary of the transformer 116 through a conductor 165, bimetal blade 135 of the translating means 115, contacts 137, 138, magnet 139, contacts 133 and 132, bimetallic member 130, wire 166, contact 164, thermostatic blade 162, thermostatic blade 161, contact 163, conductor 167, relay coil 168 and conductor 169 back to the transformer secondary. This circuit will cause the relay to pull in and contacts 121 and 122 for the fuel control means will engage to energize the fuel control means 117 and contacts 170 and 171 will also engage.

Engagement of relay contacts 170 and 171 will establish a holding circuit for the relay 125 as follows: from the transformer secondary 116, through conductor 165, through the translating means 115, as hereinbefore traced, through conductor 166, contact 164, contact arm 162, bimetal 160, conductor 172, contact 171, contact blade 170, conductor 173, relay coil 168, and conductor 169 back to the other side of the transformer secondary. It is seen by the above circuit that the control for the fuel control means is under the influence of a condition responsive means such as the thermostat 116a, as well as under control of the liquid level responsive means 119. The thermostat 116a can therefore cause intermittent operation of the fuel control means in response to some other condition than the condition of liquid level in the boiler. However, the operation of the fuel control means in response to the action of the thermostat 116a will depend upon the operation of the translating means 115 which is under control of the liquid level responsive means 119.

It will be noted upon a consideration of the translating means 115 that if either one of the heaters 131 or 136 should burn out that the bimetal heated thereby will cool off to cause opening of the contacts connected thereto. Likewise, if either of the elements of the boiler element 119 were to burn out, this would result in cooling off of the bimetal to cause opening of the contacts. If there should be a breakage in the wires connecting either the boiler element or the translating element, both of the bimetal elements 130 and 135 will cool off. However, because the stop member 143 limits the movement of the magnetic member carrying the contacts 133 and 138, the bimetals would move away from the contacts so that the circuit would be broken in such event.

While I have shown two forms which my invention may take, it will be obvious that others skilled in the art will conceive many modifications thereof. For this reason I wish not to be limited only to those forms of my invention shown and described but by the scope of the appended claims and the prior art.

I claim as my invention:

1. A liquid level responsive device comprising in combination, a liquid container having a liquid therein, a first resistance element which changes in electrical conductivity upon changes in temperature, said first resistance element being in good thermal conductive relationship with said liquid, a second resistance element which also changes in electrical conductivity upon changes in temperature, said second resistance element being in relatively poor thermal conductive relationship to said liquid, the said first and second elements adjacent the normal liquid level in said container, first and second electrical circuits to said elements for supplying energy thereto to cause said elements to be heated, first means responsive to the current flow in said first circuit, second means responsive to the current flow in said second circuit, and means controlled by the relative movement of said first and second means.

2. In a liquid level responsive device for a liquid container having a liquid therein; liquid level responsive means comprising, a plug for mounting through a wall of said container adjacent the normal liquid level therein, a first electrical resistance carried by said plug and extending into said container, a first electric supply circuit for said first resistance for causing said resistance to be heated, said first resistance dissipating said heat to said liquid at a faster rate than said heat is dissipated to the gas of said liquid, first means responsive to the current flow in said first circuit; temperature compensating means for said liquid level responsive means comprising, a second electrical resistance carried within said plug to respond substantially only to the temperature of said liquid, a second electrical supply circuit therefor to cause said resistance to be heated, second means responsive to the current flow in said second circuit, and means controlled by the relative movement of said first and second means.

3. In a liquid level responsive device for a liquid container having a liquid therein; liquid level responsive means comprising, a plug for mounting through a wall of said container adjacent the normal liquid level therein, first and second heated electrical resistance elements carried by said plug, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, first and second means responsive to the flow of current in the said circuit means, and means controlled by the relative movement of said first and second means.

4. In a liquid level responsive device for a liquid container having a liquid therein; liquid level responsive means comprising, first and second heated electrical resistance elements adjacent the normal liquid level in said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, first means responsive to flow of current in said circuit means, second means responsive to the flow of current in said circuit means, and means controlled by the relative movement of said first and second means.

5. In a liquid level responsive device for a liquid container having a liquid therein; liquid level responsive means comprising, first and second heated electrical resistance elements adjacent the normal liquid level in said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, first means responsive to flow of current in said circuit means, second means responsive to flow of current in said circuit means, said first and second responsive means arranged in substantially parallel relationship, and means controlled by the relative movement of said first and second means.

6. In a liquid level responsive device for a liquid container having a liquid therein; liquid level responsive means comprising, first and second heated electrical resistance elements adjacent the normal liquid level in said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, a first electric heater in the circuit to said first element, a second electric heater in the circuit to said second element, first and second thermally distortable means affected by said first and second heaters, and means controlled by the differential distortion of said distortable means caused by the differential electrical capacity of said elements.

7. In a liquid level responsive device for a liquid container having a liquid therein; liquid level responsive means comprising, a plug for mounting through a wall of said container adjacent the normal liquid level therein, first and second heated electrical elements carried by said plug, one of said electrical elements being in relatively good thermal conductivity with said liquid so as to respond to liquid level changes, and the other of said electrical elements being in relatively poor thermal conductivity with said liquid, both of said electrical elements varying in electrical capacity upon changes in temperature, electrical circuit means for supplying said elements with energy, a first electrical capacity responsive means in the circuit to the first of said elements, a second electrical capacity responsive means in the circuit to the second of said elements, control means operated in accordance with the difference in response of said first and second electrical capacity responsive means, and control means operated by the differential expansion and contraction of said resistances.

8. In a liquid level responsive device for a liquid container having a liquid therein; liquid level responsive means comprising, a plug for mounting through a wall of said container adjacent the normal liquid level therein, first and second heated electrical elements carried by said plug, one of said electrical elements being in relatively good thermal conductivity with said liquid so as to respond to liquid level changes, and the other of said electrical elements being in relatively poor thermal conductivity with said liquid, both of said electrical elements varying in electrical capacity upon changes in temperature, electrical circuit means for supplying said elements with energy, first and second heat responsive elongated expansible resistance wires, said first wire being in the circuit to said first element and said second wire being in the circuit to said second element, and control means operated by the relative movement of said first and second expansible resistance wires.

9. In a liquid level responsive device for a liquid container having a liquid therein; liquid level responsive means comprising, first and second heated electrical elements adjacent the normal liquid level in said container, one of said electrical elements being in relatively good thermal conductivity with said liquid so as to respond to liquid level changes, and the other of said electrical elements being in relatively poor thermal conductivity with said liquid, both of said electrical elements varying in electrical capacity upon changes in temperature, electrical circuit means for supplying said elements with energy, a first electric heater in the circuit to said first element, a second electric heater in the circuit to said second element, first and second thermally distortable means affected by said first and second heaters, and means controlled by the differential distortion of said distortable means caused by the differential electrical capacity of said elements.

10. In a liquid level responsive device for a liquid container having a liquid therein; liquid level responsive means comprising, a plug for mounting through a wall of said container adjacent the normal liquid level therein, a first self heating electrical resistance element carried by said plug and extending exteriorly therefrom, insulating means for keeping said first element out of electrical contact with said liquid while providing good thermal conductivity thereto, said first element having a poor thermal conductivity characteristic to the gas of said liquid, a second self heating electrical resistance element carried within said plug so as to be responsive substantially only to the temperature of said liquid, said first and second elements being variable in electrical conductive capacity in response to changes in their temperatures, electrical circuit means for supplying said elements with energy, first and second heat responsive elongated expansible resistance wires, said first wire being in the circuit to said first element and said second wire being in the circuit to said second element, said wires being arranged substantially parallel, means placing said wires under tension, and contact means moved by the differential expansion of said wires caused by the changes in the electrical capacity of said elements due to liquid level changes.

11. In a liquid level responsive device for a liquid container having a liquid therein; liquid level responsive means comprising, a plug for mounting through a wall of said container adjacent the normal liquid level therein, a first self heating electrical resistance element carried by said plug and extending exteriorly therefrom, insulating means for keeping said first element out of electrical contact with said liquid while providing good thermal conductivity thereto, said first element having a poor thermal conductivity characteristic to the gas of said liquid, a second self heating electrical resistance element carried within said plug so as to be responsive substantially only to the temperature of said liquid, said first and second elements being variable in electrical conductive capacity in response to changes in their temperatures, electrical circuit means for supplying said elements with energy, a first electric heater in the circuit to said first element, a second electric heater in the circuit to said second element, first and second thermally distortable means affected by said first and second heaters, and means controlled by the differential distortion of said distortable means caused by the differential electrical capacity of said elements.

12. In a liquid level control comprising a device adapted for mounting on a liquid container adjacent the normal liquid level therein, first and second means, means controlled by said first and second means, a circuit for said first means, a circuit for said second means, the first and second means responsive to the flow of current in their circuits for controlling said control means, the combination of, a first energy dissipating means mounted within said container in good thermal conductivity to the mediums therein, said first dissipating means being supplied with electrical energy from one of said circuits and having the characteristic of giving up energy to said liquid more rapidly than to the gas of said liquid, and liquid temperature compensating means for said first dissipating means comprising a second energy dissipating means adjacent said first dissipating means, said second dissipating means being in relatively poor thermal conductivity to said liquid so as to respond substantially only to the temperature of the liquid and being relatively insensitive to liquid level changes, said second dissipating means being supplied with electrical energy from the other of said circuits.

13. In a liquid level responsive device for a liquid container having a liquid therein, liquid level responsive means adjacent the normal liquid level in the said container, comprising an electrical current carrying temperature variable conducting means responsive to liquid level, and an electrical current carrying liquid temperature compensating means therefor, electrical circuit means connected to each of said current carrying means, means responsive to current flow in one of said circuits, means responsive to flow of current in the other of said circuits, and means controlled by relative movement of said first and second means.

14. In conjunction with a liquid container, a liquid level responsive device comprising first and second elements which vary differently in electrical capacity upon predetermined changes in liquid level, a first electrical capacity responsive means in the circuit to the first of said elements, a second electrical capacity responsive means in the circuit to the second of said elements, control means operated in accordance with the difference in response of said first and second electrical capacity responsive means, and means biasing said capacity responsive means to disable said control means in the event that one or both of said capacity responsive means should be rendered inoperative.

15. In conjunction with a liquid container, a liquid level responsive device comprising first and second elements which vary differently in electrical capacity upon predetermined changes in liquid level, first and second heat responsive elongated expansible resistance wires, said first wire being in the circuit to said first element and said second wire being in the circuit to said second element, said wires being arranged substantially parallel, means placing said wires under tension, contact means moved by the differential expansion of said wires caused by the changes in the electrical capacity of said elements due to liquid level changes, and means biasing said first and second wires for opening said contact means in the event that both of said wires should break.

16. In a liquid level responsive device for a liquid container having a liquid therein; liquid level responsive means comprising, first and second heated electrical resistance elements adjacent the normal liquid level in the said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, a first electric heater in the circuit to said first element, a second electric heater in the circuit to said second element, first and second thermally distortable means affected by said first and second heaters, control means actuated by the differential distortion of said distortable means caused by the differential electrical capacity of said elements, a second circuit means, the first and second thermal distortable means in the second circuit means, thermostatic means in the second circuit means, and the thermostatic means operable in response to ambient temperature of a medium for controlling the operation of the control means.

17. A liquid level responsive device comprising in combination, a liquid container having a liquid therein, a first resistance element which changes in electrical conductivity upon changes in temperature, said first resistance element being in good thermal conductive relationship with said liquid and poor thermal conductivity to the gas of said liquid so as to respond to liquid level changes, a second resistance element which also changes in electrical conductivity upon changes in temperature, said second resistance element being responsive only to the temperature of said liquid, first and second electrical circuits to said elements for supplying energy thereto to cause said elements to be heated, first means responsive to the current flow in said first circuit, second means responsive to the current flow in said second circuit, control means actuated by the relative movement of said first and second means, thermostatic means in a third circuit with said first and second responsive means, the thermostatic means movable in one direction in response to the ambient temperature of a medium for operating said control means when the first responsive means is moved in one direction caused by the differential electrical capacity of said elements, the thermostatic means movable in a second direction in response to the ambient temperature of a medium for moving control means to its inoperative position.

18. A liquid level responsive device comprising in combination, a liquid container having a liquid therein, a first resistance element which changes in electrical conductivity upon changes in temperature, said first resistance element being in good thermal conductive relationship with said liquid and poor thermal conductivity to the gas of said liquid so as to respond to liquid level changes, a second resistance element which also changes in electrical conductivity upon changes in temperature, said second resistance element being responsive substantially only to the temperature of said liquid, the first and second elements spaced adjacent the normal liquid level in said container, first and second electrical circuits connected to said elements for supplying energy thereto to cause said elements to be heated, first means responsive to the current flow in said first circuit, second means responsive to the current flow in said second circuit, means controlled by the relative movement of said first and second means, and thermostatic means arranged to be in circuit with said first and second means, the thermostatic means operable in response to the ambient temperature of a medium for controlling said control means when neither the first nor second responsive means have not been moved to break said thermostatic circuit in response to a change in current carrying capacity of said first and second resistance elements.

19. In a liquid level responsive device for a liquid container having a liquid therein, liquid level responsive means comprising, a plug for mounting through a wall of said container adjacent the normal liquid level therein, a first and second heated electrical resistance element carried by said plug, said elements being responsive to temperature to vary the electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, a first electric heater in the circuit to said first element, a second electric heater in the circuit to said second element, first and second thermally distortable means affected by said first and second heaters, and means controlled by the differential distortion of said distortable means caused by the differential electrical capacity of said elements.

20. In a liquid level responsive device for a liquid container having liquid therein, liquid level responsive means comprising, a plug for mounting through a wall of said container adjacent the normal liquid level therein, a first heating electrical resistance element carried by said plug, insulating means for keeping said first element out of electrical contact with said liquid while providing good thermal conductivity thereto, said first element having a poor thermal conductivity characteristic to the gas of said liquid, a second heating electrical resistance element carried within said plug so as to be responsive substantially only to the temperature of said liquid, said first and second elements being variable in electrical conductive capacity in response to changes in their temperatures, first circuit means for the first resistance element, a second circuit means for the second resistance element, first responsive means in the first circuit means to the first resistance element, said first means responsive to the flow of current in said first circuit means, second responsive means in the second circuit means to the second resistance element, said second means responsive to the flow of current in the said second circuit means, control means actuated by the second circuit means, control means actuated by the first and second responsive means, a third circuit means for the first and second responsive means, a thermostatic control means in the third circuit means for the first and second responsive means, and the thermostatic control means operable in response to the ambient temperature of a medium for controlling the operation of the control means.

21. In a liquid level responsive device for a liquid container having a liquid therein, liquid level responsive means comprising first and second heated electrical resistance elements adjacent the normal liquid level in the said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, a control means, first and second responsive means having relative movement caused by the differential electrical capacity of said elements, the first responsive means moved in a first sense by the flow of current through the first and second resistance elements when the liquid in the container is at its normal level for operation of the control means, the first responsive means moved in a second sense by the flow of current through the first and second resistance elements when the liquid in the container is below its normal level for actuating the control means to its inoperative position, a second circuit means for the first and second responsive means, a thermostatic control means in the second circuit means, the thermostatic control means actuated in a first sense by the ambient temperature of a medium for the operation of the control means, and the thermostatic means actuated in a second sense by the ambient temperature of a medium for moving the control means to its inoperative position.

22. In a liquid level responsive device for a liquid container having a liquid therein, liquid level responsive means comprising, first and second heated electrical resistance elements adjacent the normal liquid level in the said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, first and second responsive means having relative movement caused by the differential electrical capacity of said elements, a control means, the first responsive means moved in a first sense by the flow of current through the first and second resistance elements when the liquid in the container is at its normal level for the operation of the control means, the first responsive means moved in a second sense by the flow of current through the first and second resistance elements when the liquid in the container is below its normal level for moving the control means to its inoperative position, a second circuit means for the first and second responsive means, a thermostatic control means in the second circuit means, the thermostatic means actuated in a first sense by the ambient temperature of a medium for the operation of the control means when the first responsive means is moved in the first sense, and the thermostatic means actuated in a second sense by the ambient temperature of a medium for moving the control means to its inoperative position, relay means in the second circuit means, and a holding circuit associated with the said relay means and the second circuit means.

23. In a liquid level responsive device for a liquid container having a liquid therein, liquid level responsive means comprising, first and second heated electrical resistance elements adjacent the normal liquid level in the said container said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, first and second responsive means having relative movement caused by the differential electrical capacity of said elements, a control means, the first responsive means moved in a one sense by the flow of current through the first and second resistance elements when the liquid in the container is at its normal level, a second circuit means for the first and second responsive means, a thermostatic control means in the second circuit means, and the thermostatic means actuated in one sense by the ambient temperature of a medium for the operation of the control means, when the first responsive means has been actuated in its one sense movement caused by the differential electrical capacity of said elements.

24. In a liquid level responsive device for a liquid container having a liquid therein, liquid level responsive means comprising, first and second heated electrical resistance elements adjacent the normal liquid level in the said container, said elements being responsive to temperature to vary their electrical conductive capacity, one of said elements having good thermal conductivity to said liquid and poor thermal conductivity to the gas of said liquid so as to respond to liquid level changes, and the other of said elements being responsive substantially only to the temperature of said liquid, electrical circuit means for supplying said elements with energy, a first electrical heater in the circuit to said first element, a second electrical heater in the circuit to said second element, a first and second thermally distortable means affected by said first and second heaters, the first distortable means moved in a first sense by the flow of current to the first and second heater means when the liquid in the container is at its normal level, the first distortable means moved in a second sense by the flow of current to the first and second heater means when the liquid in the container is below its normal level, a control means actuated by the first and second sense movements of the first distortable means, a second circuit means for the first and second thermally distortable means, a thermostatic control means in the said second circuit means, the thermostatic means actuated in a first sense by the ambient temperature of a medium for operating the control means when the first distortable means has moved in the first sense, and the thermostatic means actuated in a second sense by the ambient temperature of a medium for moving the control means to its inoperative position.

25. In combination with a liquid container, means for supplying liquid to the container, means for supplying fuel for heating the container, a liquid level responsive device comprising first and second elements which vary definitely in electrical capacity upon predetermined changes in liquid level, a translating mechanism comprising first and second electrical capacity responsive means and a plurality of conductors, a first circuit connecting the first electrical capacity responsive means to the first of said elements, a second circuit connecting the second responsive means to the second of said elements, a third electrical circuit established through at least two of the said conductors of the translating means when the liquid level is at a predetermined high level in the container and in contact with the said first and second elements, a first relay in the said third circuit, a holding circuit established through at least two other of said conductors of the translating means and the first relay for maintaining the first relay closed when the liquid in the container is at the predetermined high level, the first relay actuated in response to the differential flow of current through said first and second responsive means in accordance with the variations in electrical capacity of said first element upon changes in the liquid level in said container, and a second relay means controlled by said first relay for governing the supply of liquid to said container and for governing the supply of fuel for heating the container.

26. In combination with a liquid container, a liquid level responsive device comprising first and second elements which vary differently in electrical capacity upon predetermined changes in liquid level, a first electrical capacity responsive means in circuit to the first of said elements, a second electrical capacity responsive means in circuit to the second of said elements, a relay actuated by the difference in response to said first and second electrical capacity responsive means in accordance with the variations in electrical capacity of said first element upon changes in the liquid level in said container, means for supplying liquid to said container, means for supplying fuel for heating the liquid container, and means controlled by said relay governing the supply of fuel for heating the container and governing the supply of liquid to said container.

27. In a liquid level responsive device for a liquid container having a liquid therein, a pair of energy responsive movable members, electrical circuit means for supplying the movable members with energy, a pair of temperature responsive variable resistance members connected in the circuit means for the pair of movable members, one of the resistance members controlling the supply of electrical energy for the energization of one of the said movable members, and the other of the resistance members controlling the supply of electrical energy for the energization of the other of the movable members, control means actuated by movement of the movable members, and the pair of resistance members varying differently in electrical capacity upon predetermined changes in liquid level to vary the electrical energy supplied to the pair of movable members so that the movable members actuate the control means.

28. A liquid level responsive device comprising in combination, a liquid container having a liquid therein, a first resistance element which changes in electrical conductivity upon changes in temperature, said first resistance element being in good thermal conductive relationship with said liquid, a second resistance element which also changes in electrical conductivity upon changes in temperature, said second resistance element being in relatively poor thermal conductive relationship with said liquid, first and second electrical circuits to said elements for supplying energy thereto to cause said elements to be heated, first means responsive to the current flow in said first circuit, second means responsive to the current flow in said second circuit, and means controlled by the relative movement of said first and second means.

ALBERT E. BAAK.